Sept. 4, 1934.    R. J. EVANS    1,972,440
PRESSURE MOLD
Filed Nov. 28, 1932
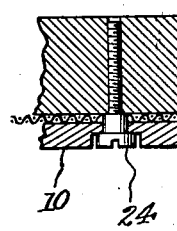
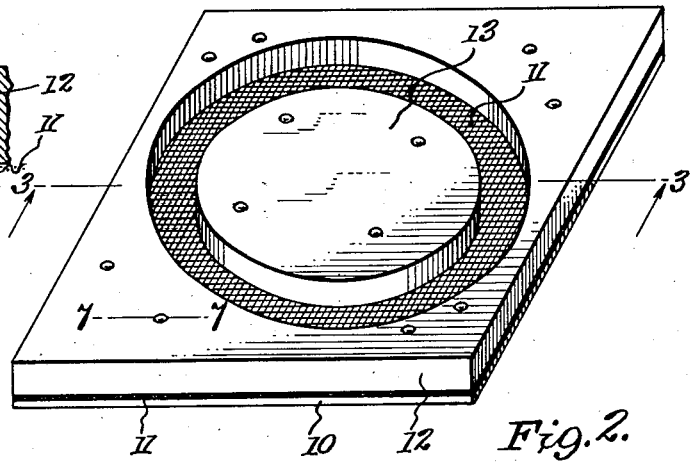
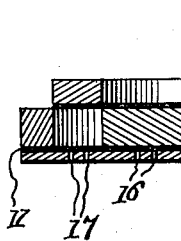
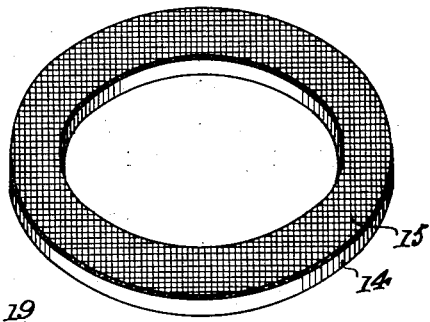
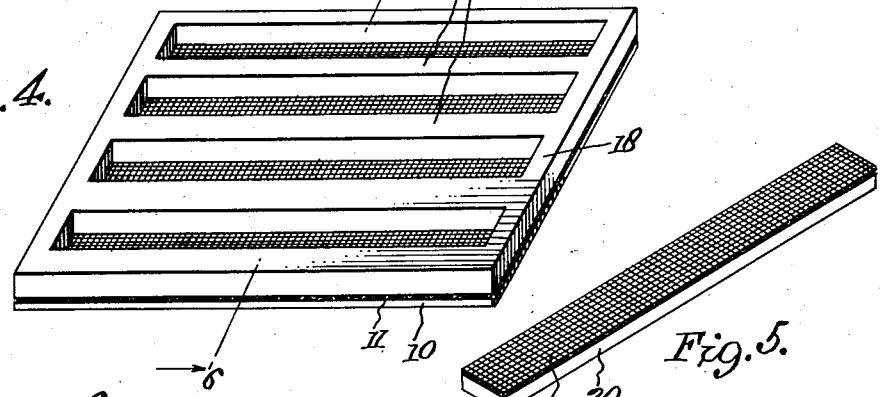
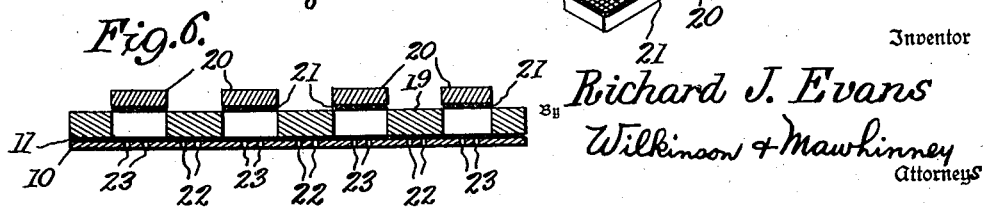
Inventor
Richard J. Evans
By Wilkinson & Mawhinney
Attorneys Patented Sept. 4, 1934

1,972,440

UNITED STATES PATENT OFFICE 1,972,440

PRESSURE MOLD

Richard J. Evans, Huntington, Ind., assignor to Asbestos Manufacturing Company, Huntington, Ind., a corporation of Indiana Application November 28, 1932, Serial No. 644,739

2 Claims. (Cl. 18—42)

The present invention relates to pressure mold, and has for an object to provide a mold to produce fibrous articles, and the like, such as clutch rings, brake lining, etc., containing a high oil content and a large percentage of graphite, metallic and other materials, and wherein it is desirable to compress the plastic substance to a predetermined density and drive off excess liquid during the molding.

Another object of the present invention is to provide a mold of this character which comprises but few parts, is substantially in plate form so that it may be handled in multiple in a suitable filling machine or the like, which is provided with improved means for admitting the release of oil or other liquid during the operation of the mold and which will vent the liquid substantially equally from all sides and edges of the article being formed to produce in the final product a uniform oil content throughout its entire width and thickness, and which is provided with air receiving openings adapted for use in extracting the article after the same has been subjected to pressure.

Another object of the present invention is to provide a mold of this character with a pressure member adapted to be forced into the cavity of the mold during compression of the plastic material and which is relatively proportioned to the depth of the mold cavity such as to insure uniformity in the density of articles produced and to insure uniformity in the proportions of the materials or ingredients which are contained in the initial plastic mass.

More particularly, the invention provides a mold with relatively hard mesh linings between the assembled parts of the mold to admit passage of the liquids under pressure outwardly between the parts of the mold and to provide such parts of the mold at the inner side of the article with liquid vents so located as to equalize the pressure at opposite sides and edges of the article so that the liquid content of the finished article may be uniform throughout.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a perspective view of a mold constructed for the manufacture of molded clutch facings of the ring type, the pressure ring being removed.

Figure 2 is a detail perspective view of the mold ring, inverted to show the meshing on the underside of the ring.

Figure 3 is a transverse section taken through the mold substantially on the line 3—3 of Figure 1 and with the pressure member in place.

Figure 4 is a detail perspective view of a body of mold shown in modified form wherein brake lining strips, or the like, may be molded.

Figure 5 is a detail perspective view in inverted position of one of the pressure members or bars used with the modified form of mold.

Figure 6 is a transverse section taken on the line 6—6 of Figure 4 through the body of the mold and showing the pressure members or bars in their relative positions over the cavities of the mold, and Figure 7 is a fragmentary enlarged sectional view taken through a portion of the mold, showing the connection between the base plate and the outer body part of the mold.

Referring now to the drawing, and first to Figures 1, 2 and 3, the mold comprises a body or base plate 10 which is of rectangular or other suitable configuration and which has a flat upper surface upon which is placed a sheet of meshing 11, of wire or other suitable relatively hard material which will not break down or close the interstices of the mesh sheet under pressure. Placed above the mesh sheet 11 is the outer portion or frame 12 of the mold having an outer configuration conforming to that of the base plate 10 but which at its inner marginal edge is of circular configuration to provide the outer wall of the mold cavity. The inner or core block 13 of cylindrical or disc form is seated upon the mesh sheet 11 concentrically within the inner opening of the frame 12 and is of desired reduced diameter with respect thereto to provide width to the annular mold cavity thus formed. The outer and inner parts 12 and 13 of the mold comprise the body of the mold and are of equal thickness and are adapted to provide a method of a depth corresponding to said thickness and of a width equal to the differences in diameters of the inner wall of the part 12 and the outer wall of the part 13.

The mold cavity is closed by a pressure member 14 which in the present instance is of ring shape and of a width equal substantially to that of the width of the mold cavity so as to fit tightly therein and to move into the cavity when the ring or pressure member 14 is subjected to pressure. The lower or inner face of the pressure member 14, is provided with a sheet or ring of meshing 15 similar to the mesh sheet 11 and which is adapted to be presented to the plastic mass in the mold cavity to carry off to the opposite edge portions of the pressure member the excess oil or other liquid contained in the mass and to thus insure an even venting of the liquid from beneath the pressure member. The oil or other liquid exuding from the mass under pressure passes upwardly between the adjacent sides of the mold cavity and the pressure member and the excess liquid may, of course, be caught in a drip pan, trough or the like, with which the press or other handling device may be equipped.

When the mold is subjected to pressure liquid from the lower portion of the plastic mass is forced outwardly through the meshes of the sheet 11 and between the base plate 10 and the outer body part 12. The base plate 10 is provided with liquid vent openings 16 which are in any suitable number and size and which are spaced inwardly from the cavity of the mold a distance substantially equal to the thickness of the outer part 12 of the mold so that the pressure required for driving off the liquid from the plastic mass at the inner side of the mold cavity will be substantially equal to the pressure required for driving the liquid outwardly through the outer edge portion of the mesh sheet 11.

The base plate 10 of the mold is also provided with ejected apertures or moldings 17 against which may be placed air pipes, nozzles or the like for the introduction of air under pressure at suitable spaced points through the bottom of the mold cavity so that the air under pressure, may be introduced against the lower side of the article after the molding operation for ejecting the article from the mold cavity. Of course, the pressure member 14 may be removed from the mold cavity in this manner together with the molded article.

In the modifications shown in Figures 4, 5 and 6, the base plate 10 is used as is also the mesh sheet 11. The body portion 18 of the mold, however, may be in the form of a plate having lengthwise extending parallel core bars or inner parts 19 providing therebetween mold cavities in the form of elongated spaced slots for receiving the plastic mass and which are of depth equal to the thickness of the body 18 of the mold, as clearly shown in Figures 4 and 6. In this instance, the pressure member comprises a plurality of bars 20 which may be separate and individual as shown for the elongated cavities of the mold of Figure 4. The bar 20 has at its under side a mesh sheet 21 adapted to enter the mold cavity when the bar 20 is forced down into the same.

The base plate 10 of the modified form of mold is provided with the liquid venting openings 22 which are spaced between the mold cavities and which, like the preferred form, open directly through the mesh sheet 11 in spaced relation to the opposite sides of the mold cavities so as to substantially equalize the pressure necessary at opposite sides of the cavities for driving off the oil content of the plastic mass. As in the preferred form the base plate 10 is provided opposite the mold cavities with fluid receiving openings 23 through which air may be forced to eject the articles when molded together with the pressure bars 20.

It is apparent that the mold cavity may be given other suitable form than as above shown. It is essential, however, that the wire meshing sheet be used, between the assembled parts of the mold, or at such portions of the cavity as to give vent under pressure to the excess oil or other liquid which is contained in the plastic mass. The mesh sheet used is of such size as to hold the mass within the mold cavity, but under a predetermined increase in pressure to allow the liquid to escape.

As shown in Figure 7, the wire meshing is held from being crushed or flattened to an extent which would seal the interstices or channels in the wire meshing, and to accomplish this the base plate 10 is countersunk and provided with openings in the bottoms of the countersinks at desired points for the reception of headed and shouldered screws 24. The shouldered portions of the screws pass not only through the base plate 10 but also through the adjacent wire mesh sheet 11 and abut against the bottom of the mold section 12. The threaded shank of the screw 24 is disposed in threaded engagement in the mold body portion. Any number of these screws 24 may be employed for holding the parts together.

It is obvious that various changes and modifications may be made in the details of construction and design of the above specifically described embodiment of this invention without departing from the spirit thereof, such changes and modifications being restricted only by the scope of the following claims.

What is claimed is:

1. A mold comprising a base portion, a body portion mounted on the base portion in spaced relation thereto, a mesh material disposed in the space between the base portion and the body portion, said body portion comprising an outer frame and an inner core block having a wall spaced from the inner wall of the outer frame to provide a mold cavity therebetween, said base portion having fluid vent openings leading to the mesh material and disposed beneath the core block adjacent the transverse center of the mold cavity and spaced from the cavity a distance substantially equal to the thickness of the outer frame, and fastening means for securing the base to the body in a manner to prevent crushing of said mesh, said fastening means comprising threaded members having a head at one end and a diameter intermediate the head and the threads greater than the diameter of the threaded portion constituting a shoulder adapted to hold the base spaced from said body.

2. A mold comprising a base portion, a body portion mounted on the base portion in spaced relation thereto, a mesh material disposed in the space between the base portion and the body portion, said body portion comprising an outer frame and an inner core block having a wall spaced from the inner wall of the outer frame to provide a mold cavity therebetween, said base portion having fluid vent openings leading to the mesh material and disposed beneath the core block adjacent the transverse center of the mold cavity and spaced from the cavity a distance substantially equal to the thickness of the outer frame, and fastening means for securing the base to the body in a manner to prevent crushing of said mesh.

RICHARD J. EVANS.